Figure 1:
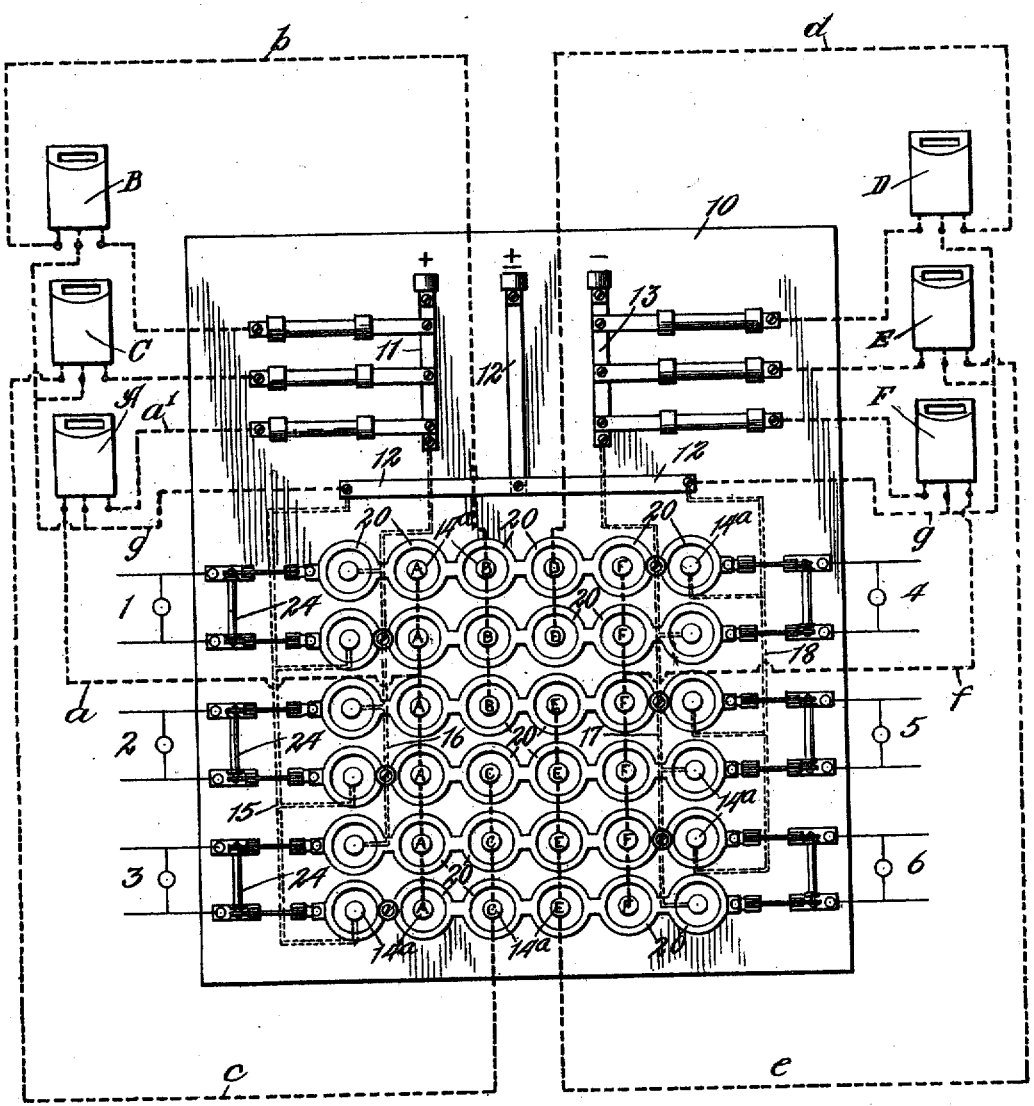

A. C. McWILLIAMS.
METERING PANEL BOARD.
APPLICATION FILED JUNE 29, 1907.

931,464.

Patented Aug. 17, 1909.
3 SHEETS—SHEET 2.

Witnesses:
Ira D. Perry
Robert H. Weir

Inventor:
Arthur C. McWilliams
By Cheever & Cox
Attys

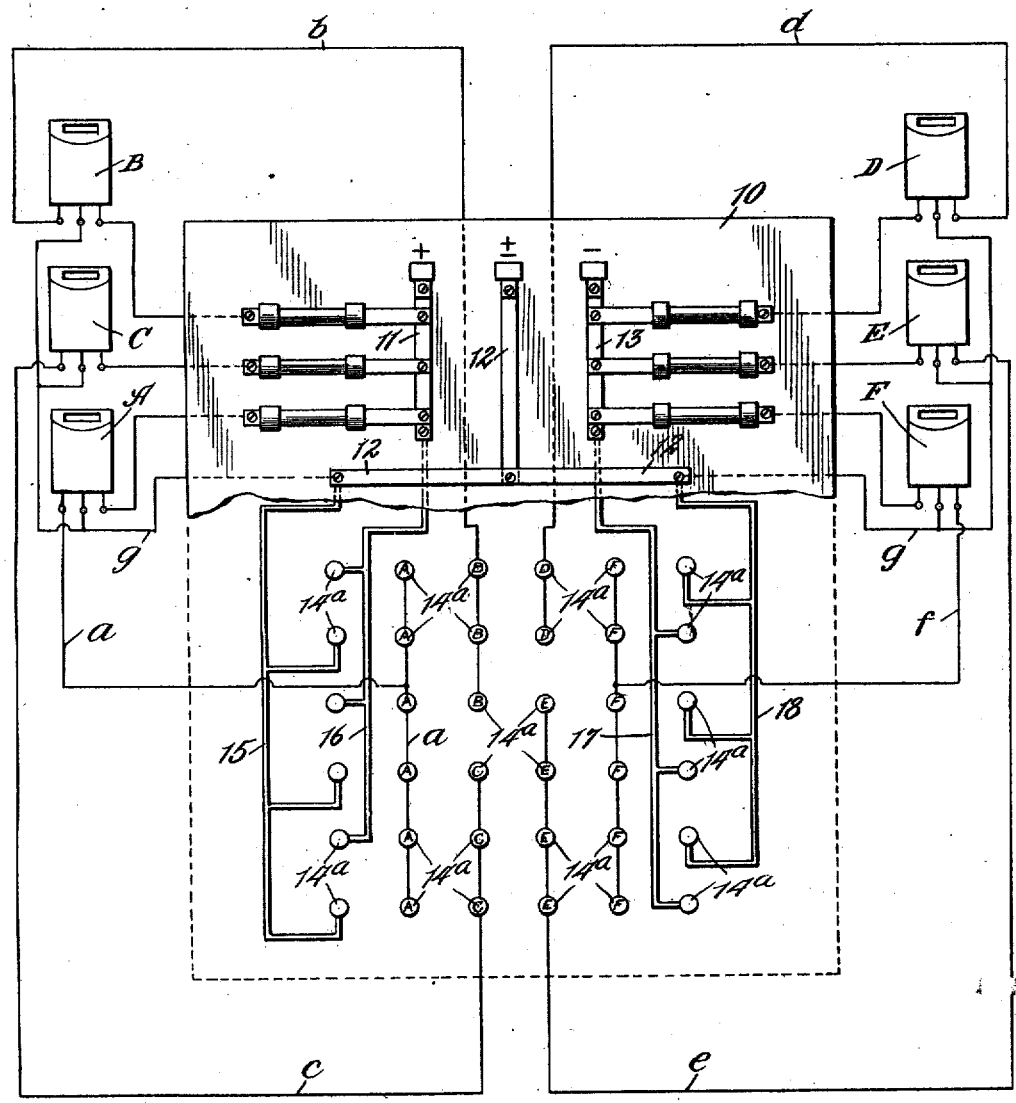

UNITED STATES PATENT OFFICE.

ARTHUR C. McWILLIAMS, OF CHICAGO, ILLINOIS.

METERING PANEL-BOARD.

No. 931,464.  Specification of Letters Patent.  Patented Aug. 17, 1909.

Application filed June 29, 1907. Serial No. 381,422.

*To all whom it may concern:*

Be it known that I, ARTHUR C. MCWILLIAMS, a citizen of the United States, residing at Chicago, in the county of Cook and State of Illinois, have invented a certain new and useful Improvement in Metering Panel-Boards, of which the following is a specification.

My invention relates to metering panel boards, and the object of the invention is to provide compact, inexpensive, durable and efficient apparatus whereby consumption circuits may be variously grouped upon meters.

One of the important objects of the invention is to provide an apparatus which may be initially installed with but few meters and meter loops or circuits but which may accommodate an increased number of meters as called for, with no other change than the attaching of the necessary meter conductors. Such a construction has the advantage of small initial cost and yet does not require any substitution of new and larger apparatus when an increased number of meters are to be put in service. As a result of my invention, it becomes possible to add meters only as they are required and to connect up said meters with no more labor than is required to connect a wire to a binding post or stud.

Another object of the invention is to economize in the space occupied by the apparatus. This, in general, is accomplished by providing a construction such that it becomes possible to run some of the meter conductors only part way across the full set of consumption circuit conductors thereby making it possible to use any given transverse row of meter contacts for more than one meter. Another feature which contributes to the resulting compactness is the manner of arranging the conductors in parallel rows extending inwardly from opposite sides of the board alternately as hereafter explained.

Another object of the invention is to provide a metering panel wherein the electrical connection between a given consumption circuit and any desired meter may be made by merely screwing a plug into one conductor and against another and to avoid the use of more than one screw thread in making this connection and also to avoid the use of fine threads which become easily damaged when repeatedly used.

Another object of the invention is to economize in the amount of copper or other material employed without sacrificing permanence and durability.

It is also an object to provide a construction such that the assembling may be done with a minimum degree of skill and labor. Contributory features of my invention which coöperate toward the accomplishment of this result arise from the construction and manner of connecting the meter contacts to the meters. This feature will again be referred to hereinafter.

An important object of the invention is to provide an apparatus of great flexibility where a great range of choice may be had by the operator in selecting the groupings of the consumption circuits upon the different meters.

If the condensed form of board here shown is employed in which some of the rows of meter contacts contain two different meter conductors, then it will not be possible to throw any consumption circuit onto any meter, but this is a condition seldom required in practice. With the form of board shown, it is possible for each consumption circuit to have its individual meter and it is also possible to connect all the consumption circuits upon one meter and it is also possible to connect any number of consumption circuits upon some one meter. Thus all the necessary flexibility or universality is obtained.

Figure 2:
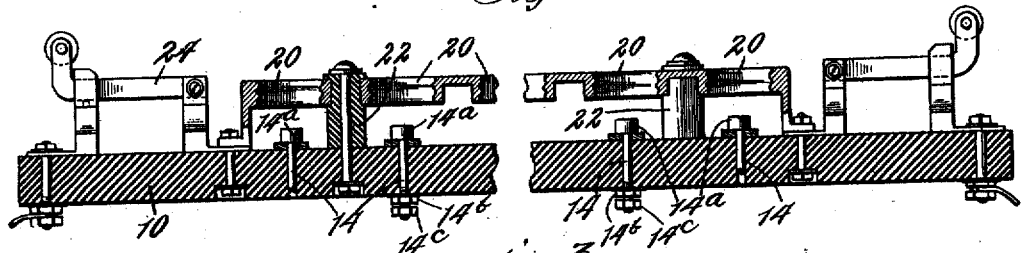
Figure 3:
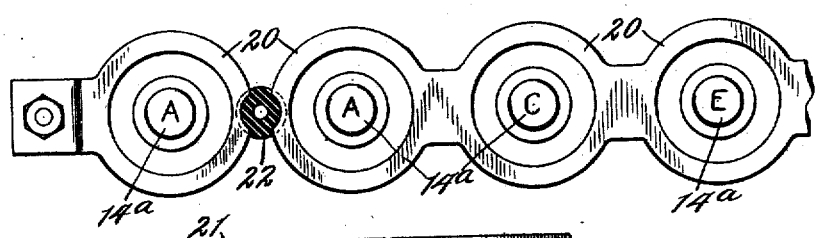
Figure 4:
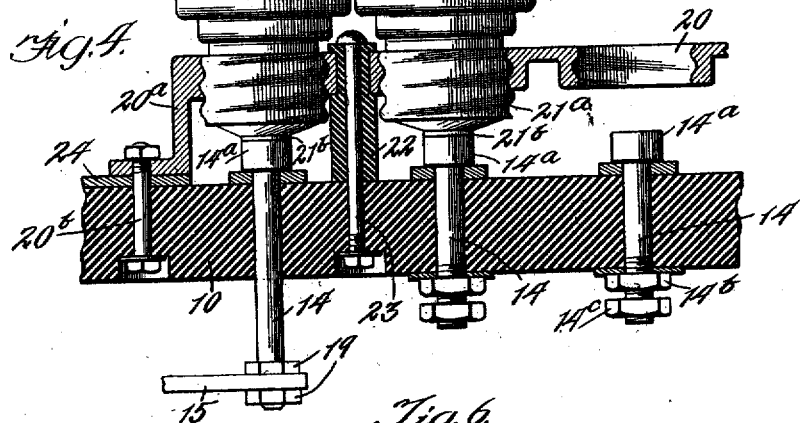

Referring to the accompanying drawings which illustrate an apparatus which I have selected as embodying an advantageous form of my invention: Figure 1 is a front or face view of the complete apparatus showing a typical arrangement of meter connections. Fig. 2 is a transverse section of the panel board drawn to a somewhat increased scale. Fig. 3 is an enlarged plan or face view of a few sockets and contacts and is intended particularly to show the manner of insulating the end socket in each horizontal row. Fig. 4 is a sectional view taken transversely to the board and again illustrating the manner of insulating the end socket from the remaining ones in the same horizontal row. Fig. 4 also illustrates the preferred manner of constructing and fastening the meter contacts. Fig. 5 is a face or front view similar to Fig. 1 except that on the lower portion in the figure the board itself is removed in order to show the arrangement of the bus bars and of the meter wires running to the contacts.

Figure 6:
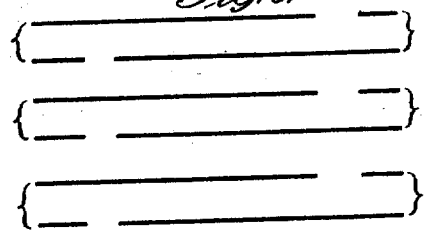

Fig. 6 is a diagrammatic view illustrating the theory of alternating the horizontal rows of sockets in order to render the board as compact as it theoretically and practically can be.

Similar numerals refer to similar parts in all the several views.

In order to facilitate a description of the apparatus and the manner of its operation, I shall assume that the board stands upright as viewed in Fig. 1 and I shall employ the term horizontal rows and vertical rows, and shall consider the lowest horizontal row of sockets to be the first row, the next row above it to be the second row, and so on. I shall distinguish between the "meter" contacts and the "line" contacts, the line contacts being arranged in the present instance in the first and last or outer vertical rows and being permanently connected to the neutral or positive or negative supply terminals as the case may be. The meter contacts form the intermediate rows (four in number in the present instance) and are designed to be connected to the meter conductors. The first vertical row of "meter" contacts is therefore, in the design illustrated, the second vertical row of contacts. Other means than the line contacts and their sockets might be employed for completing the electrical connection between the line and one side of the consumption circuit. It will be understood that the consumption circuit conductors might be run vertically instead of horizontally if a corresponding change be made in the arrangement of the meter wires.

The board proper consists of a board or slab 10, of slate, marble or other suitable material. By preference bus bars 11, 12, 13, are mounted upon the board and adapted to be connected with the external lines which lead from the source of electrical energy. In the form shown there are three of these bus bars, the apparatus being adapted for a three wire system. In the arrangement shown, the bars 11, 12 and 13 are positive, neutral and negative, respectively. In the arrangement shown, the three meters A, B, C, are connected on one side to the bus bar 11 and in a similar manner the meters D, E, and F, are connected on one side to the bus bar 13. It will be understood that although only six meters are here shown, the apparatus may be designed for any number of meters and any number of translation or consumption circuits. The other side of the different meters are connected to certain ones of the contacts 14. A suitable construction of said contacts is clearly shown in Fig. 4, in which they are provided with heads 14$^a$ adapted to project above or in front of the board. The meter contacts extend through the board, at the back of which they are threaded and provided with nuts 14$^b$ for holding them in place. Binding nuts 14$^c$ are also provided for fastening the conductors which lead to the meters.

The line contacts, in the first and last vertical rows, are designed to be connected to the source of supply through some one of the bus bars 11, 12 or 13. In ordinary commercial practice these bars would be straight and would lie in different planes, but for the sake of clearness I have shown them in bent form in Figs. 1 and 5. In the particular design of apparatus shown in the drawings the first, third and fifth line contacts in the first vertical row are connected to the neutral bus bar 12 by means of the bar 15; the second, fourth and sixth contacts in the same vertical row are connected to the bus bar 11 by means of the bar 16. The first, third and fifth line contacts in the sixth vertical row are connected to the bus bar 13 by means of the bar 17; and the second, fourth and sixth line contacts in the same vertical row are connected to the neutral bus bar 12 by means of the bar 18. This arrangement is clearly shown in Fig. 5. The preferred means for electrically connecting said line contacts to the bars 15, 16, 17 and 18 is illustrated in detail in Fig. 4. In this form the lower or rear extremities of said contacts are threaded and the bars are held in position by means of nuts 19.

In front or above each one of the contacts 14 is located a socket 20 adapted to receive a plug 21 for establishing the electrical connection between the socket and its respective contact. Plugs of the type which I prefer to employ and which are best illustrated in Fig. 4 are now well known in the art and are upon the market. This type of plug has a threaded collar 21$^a$ which is connected by a suitable fuse (not shown) in the interior of the plug with the contact terminal 21$^b$. The sockets which I employ are threaded to receive the said threaded collar 21$^a$ and the parts are so arranged that when the plug is screwed down into the socket electrical connection will be established between the contact 14 and the associated socket. Except as hereinafter noted all the sockets of any horizontal row are electrically connected together. The insulated sockets are the first, third and fifth in the first vertical row and the second, fourth and sixth in the sixth vertical row. It will thus be seen that the rows of connected sockets run in from opposite sides of the board alternately, one end socket in each row being insulated from the others. This idea is diagrammatically illustrated in Fig. 6 and is apparent from an examination of Fig. 1. The advantage in this arrangement is that two translating circuits may come opposite to each other on different sides of the board and the two opposite consumption circuits may occupy the space, vertically, of only one double row of sockets. This idea of alternating the conductors for the equalizing of space is not herein broadly claimed, however, it being shown in my co-pending application filed September 30, 1905, Serial No. 280,802. A suitable manner of mounting the sockets upon the board is shown particularly in Figs. 2, 3 and 4, the end sockets of any given rank being supported by means of legs 20$^a$ held in position by means of bolts 20$^b$. The insulated end sockets are insulated from the others, preferably by means of an insulating post 22 and a stud 23. The sockets at the ends of the horizontal rows are suitably connected to switches 24, adapted to control the different consumption circuits 1, 2, 3, 4, 5 and 6. Of course, said switches may be omitted and other forms of connectors may be substituted.

I will now explain the method of wiring which is possible in my apparatus and by which there may be more meter loops or circuits than there are vertical rows of meter contacts. Briefly this is accomplished by making a vertical row of meter contacts serve for two different meters. In the particular arrangement shown, all the meter contacts in the first or left vertical row thereof are connected by means of a conductor $a$ to the meter A. The first second and third meter contacts in the second vertical row are connected by the conductor $c$ to the meter C. The fourth, fifth and sixth meter contacts in the second vertical row are connected by the conductor $b$ to the meter B. The first, second, third and fourth meter contacts in the third vertical row thereof are connected by the conductor $e$ to the meter E. The fifth and sixth meter contacts in the third vertical row thereof are connected by the conductor $d$ to the meter D. All the meter contacts in the fourth vertical row thereof are connected by the conductor $f$ to the meter F. Pressure wires $g$, $g$ should also connect the meters with the neutral bus bar 12.

In order to assist the electrician in determining which meter contacts are connected to the different meters, it is desirable to mark the different meters A, B, C, etc., and to mark corresponding letters upon the heads of the contacts which are electrically connected to them. This is illustrated in Fig. 1 wherein it is shown that the letters A, B, C, etc., are stamped upon the front or upper surface of the proper ones of said meter contacts.

I will now describe the operation of the board when wired in the particular manner shown in the accompanying drawing. Suppose it is desired to connect consumption circuit 1 to meter A, the operator will screw a plug into the fifth socket in the first vertical row and the sixth socket in the second vertical row. The circuit will then be complete from the bus bar 11 through the conductor $a'$ to the meter A, thence through the conductor $a$ to the sixth contact in the first vertical row of meter contacts, thence through the superposed socket, thence through the adjoining socket to the left, thence through consumption circuit 1 back through the fifth socket of the first vertical row, thence through the fifth contact in the first vertical row, thence through the conductor 15 to the neutral bus bar 12. All that is necessary for the operator to do to add all of the consumption circuits to said meter A would be to screw additional plugs into the remaining five sockets of the second vertical row. All that would be necessary to do in order to throw the consumption circuit 1 onto meter B, D or F instead of meter A would be to unscrew the plug from the sixth meter contact in the first or "A" row of meter contacts and move it over toward the right to the "B" or "D" or "F" row as desired. All of the consumption circuits may be thrown onto meter A by screwing a plug into all of the sockets above the "A" row of meter contacts (which is the first vertical row of meter contacts.)

In an analogous manner all of the consumption circuits could be thrown onto the meter F. It is also true that any one of the six consumption circuits may be thrown onto the meter A or any one of them onto the meter F. As the conductor $b$ is connected to only three contacts, not more than three consumption circuits may be connected to the meter B. And similarly no more than three can be connected to the meter C, nor more than two to the meter D, nor more than four to the meter E. However, all of the consumption circuits may be connected to some one meter and some of the meters may take any one or all of the consumption circuits. Therefore the extreme limits in the range of possibility are provided for. Any grouping or combination between these extremes may be obtained by a proper selection of meters by the operator. For example, if the operator knows that a tenant will probably not use more than one or two rooms (each room being represented in the drawings as a separate consumption circuit) the operator would not choose meters A or F, but would select one of the meters having a smaller number of connections, for example, the meter D. If a tenant would probably use three or four rooms or circuits the operator would properly select meter E which has the possibility of connection to four different consumption circuits. If the tenant would use or be likely to use six rooms or consumption circuits the operator would select either one of the meters A or F. Thus all practical probabilities are provided for. The advantage in the economy of space is apparent, for with my present construction it is not necessary to connect all of the meters to all of the meter contacts in any given vertical row, and consequently some of the vertical rows accommodate a plurality of different meter conductors and the width of the board is lessened one full socket space for every vertical row which contains two meter conductors.

It will be noted that as the second, fourth and sixth line-contacts in the first vertical row, and the first, third and fifth line-contacts in the last vertical row are connected by the bars 16 and 17, respectively, to the bus bars 11 and 13, respectively, the different consumption circuits may be properly connected with the source of supply without having the current passed through any meter at all, for example, consumption circuit 3 may be connected by inserting plugs in the first and second sockets of the first vertical row of sockets. Said consumption circuits would then be connected to the bars 11 and 12 through the conductors 15 and 16. This provision is made for the purpose of rendering it possible for some of the circuits to be supplied with electrical energy without passing the current through a meter. This is desirable in office buildings, for example, where the owners of the building provide the current consumed in lighting the hallways, elevators, etc.

With my apparatus, the maximum number of meters may be put in at the time of installation if desired, but as it is possible with my construction to connect up the meters by employing merely ordinary wires and ordinary binding nuts or screws, it is quite possible to install at first only so many meters as are actually required and subsequently add meters as required. In other words, the act of adding new meters is very simple and may be done at any time during or after the installation of the apparatus; consequently it is unnecessary to install, initially, any more meters than are actually required at the time. This reduces the initial outlay to a minimum. On account of the facility with which the meter wires may be connected up to the desired meter contacts it is a simple matter to rearrange the meter circuits at any time so that a given meter circuit may include a greater or less number of meter contacts in any vertical row. On account of the practicability of employing wires in my panel board for the meter circuits instead of stationary bus bars the cost of construction is materially reduced.

All of the combinations and variations in grouping which I have described are accomplished in the form of apparatus shown with only six vertical and six horizontal rows of sockets. And practically perfect flexibility is afforded not only for metering all of the circuits, but for throwing any one or all of them onto the line contacts in order that the consumption circuits may be energized without being metered. I do not wish to be understood, however, as limiting myself to an apparatus of the precise form or arrangement as here shown. For instance, other means than the line contacts with their respective sockets might be employed for the purpose of connecting the consumption circuits to the supply lines. Moreover it is not necessary that the number of meters be equal to the number of consumption circuits, for in actual practice the average tenant occupies more than one room and of course all of his rooms or consumption circuits can be taken care of by a single meter.

It will be understood that although I have employed the terms "vertical" and "horizontal" in referring to the arrangement of the contacts and sockets these terms are employed merely for the sake of clearness, and both in the description and claims they may be interchanged and the structure still come within the principle of the invention.

It is obvious that the electrically connected sockets in any given horizontal row constitute a single conductor, and consequently the horizontal rows of electrically connected sockets constitute a set of parallel conductors.

What I claim as new and desire to secure by Letters Patent, is:

1. A metering panel board having two rows of electrically connected sockets extending alternately to opposite sides of the board and a contact for each socket, the contacts being arranged in rows transverse to the rows of sockets and the contacts of a single row belonging to two different groups, the members of a group being electrically connected together for the purposes described.

2. A metering panel board having rows of electrically connected sockets extending alternately to opposite sides of the board where they may be connected to consumption circuits, and a contact for each socket, the contacts being arranged in rows transverse to the rows of sockets and the contacts of a single row belonging to two different groups, adapted for connection to two different meters.

3. A metering panel board having parallel conductors adapted for electrical connection to the consumption circuits, said conductors each comprising a plurality of sockets, said parallel conductors being arranged alternately so that one conductor leads to one side of the board while the adjacent conductors lead to the opposite side of the board, a meter contact associated with each socket, the meter contacts lying in rows transverse to the parallel conductors and a single row of meter contacts comprising a plurality of groups the members of which are electrically connected, one group of contacts being adapted for connection to one meter and another group to another meter.

4. In combination, a board of insulating material, meter contacts adapted to be connected to meter wires, said contacts being so arranged as to form both vertical and horizontal rows, parallel rows of electrically connected sockets, each row being adapted to be connected to an external consumption circuit, and said sockets being located in juxtaposition to their respective contacts, and plugs for electrically connecting said sockets to said contacts.

5. In combination, a board of insulating material, cross rows of meter contacts mounted thereon, meter circuits including meters, any given meter being connected to a plurality of meter contacts in a vertical row and there being more meter circuits than there are horizontal rows of electrically connected sockets adapted to be connected to external consumption circuits there being a socket adjacent to each meter contact, and plugs for electrically connecting the sockets to their respective meter contacts.

6. Apparatus for measuring the electrical energy consumed in different consumption circuits said apparatus comprising a board of insulating material, parallel rows of electrically connected sockets adapted to be connected to the respective consumption circuits, a meter contact in juxtaposition to each of said sockets, said contacts forming rows parallel to the rows of electrically connected sockets and rows transverse thereto, meters exceeding in number the number of transverse rows of meter contacts, meter terminals, meter conductors leading from one side of the meters to said meter terminals and meter wires leading from the other side of the meters to a plurality of contacts in a transverse row, some of said transverse rows of contacts having two different and separate meter wires connected to them whereby there are more meters and meter circuits than there are transverse rows of meter contacts.

7. A panel board in which there are more meter circuits than there are outlets in the consumption circuit bars, said panel board comprising a board of insulating material, parallel consumption circuit bars adapted to be connected to consumption circuits and having sockets formed therein which constitute outlets for the consumption circuits, meter contacts arranged in juxtaposition to each socket of the consumption circuit bars, said meter contacts being so arranged as to form rows parallel to the consumption circuit bars and rows transverse thereto, meters exceeding in number the number of outlets or sockets in any given consumption circuit bar, meter wires and means on each of said meter contacts whereby the latter may be connected to said meter wires.

8. In a metering panel board, a board of insulating material, a row of electrically connected sockets adapted to be connected to one side of a consumption circuit, a single socket insulated from the others and adapted to be connected to the other side of said consumption circuit, a supply contact adapted to be connected to the source of supply, means for connecting said supply contact to said single socket, a row of meter contacts all adapted to be connected to different meters, said meter contacts being in a row parallel to said row of sockets, means for connecting said meter contacts to the sockets in the row parallel to them, and a supply terminal adapted to be connected to the aforesaid meters on the side thereof opposite to the side connected to said meter contacts.

9. In a metering panel board, a board of insulating material, a row of electrically connected sockets adapted to be connected to one side of a consumption circuit, a single socket insulated from the others and adapted to be connected to the other side of said consumption circuit, a supply contact adapted to be connected to the source of supply, means for connecting said supply contact to said single socket, a row of meter contacts all adapted to be connected to different meters, said meter contacts being in a row parallel to said row of sockets, means for connecting said meter contacts to the sockets in the row parallel to them, a supply terminal adapted to be connected to the aforesaid meters on the side thereof opposite to the side connected to said meter contacts, a second supply contact in line with said meter contacts and means for connecting said second supply contact with one of the sockets in the row of electrically connected sockets.

10. In a metering panel board the combination with meters and a board of insulating material, of two parallel rows of electrically connected sockets adapted to be connected to different consumption circuits on opposite sides of the board, a single socket in line with each of the aforesaid rows of sockets, said single sockets being adapted to be connected to the remaining side of said consumption circuits, said single sockets being connected to a different consumption circuit from the other sockets in the same line, a row of metering contacts parallel and adjacent to each row of sockets, the metering contacts in any given row being adapted to be all connected to different meters, plugs for connecting said electrically connected sockets to the meter posts in the adjacent parallel row, a supply contact adjacent to each of said single sockets, means for connecting said single sockets to the adjacent supply contact, and supply terminals on said board adapted to be connected to the aforesaid meters.

11. A metering panel board having consumption circuit conductors running one way and meter circuit conductors running crosswise thereto for giving a choice of metering connections, one kind of said conductors running less than the entire distance across the other, and being arranged with two conductors placed in substantially the same straight line, each crossing a plurality of the conductors transverse to them.

12. A metering panel board having consumption circuit conductors running one way and meter circuit conductors running crosswise thereto for giving a choice of metering connections, one kind of said conductors running less than the entire distance across the other, and being arranged with pairs of them in substantially the same straight line, each of the conductors in a pair crossing a plurality of the conductors transverse to them.

13. A metering panel board having consumption circuit conductors running one way and meter circuit conductors running crosswise thereto for affording a choice of metering connections, one kind of said conductors being connected up alternately, with one end of the first conductor connected on one side of a median line and one end of the next conductor connected on the opposite side of said median line so that the connections for different external circuits may come opposite to each other on the board to thereby economize space, one kind of said cross conductors being provided with screw threaded sockets and the other kind of said conductors being provided with contacts and screw plugs adapted to screw into said sockets for establishing electrical connection between said cross conductors.

14. A metering panel board having a plurality of horizontal rows of sockets, a plurality of the sockets in any horizontal row being electrically connected and the sockets of alternate rows leading to external circuits on opposite sides of the board, contacts on the board electrically connected with other external circuits, means for connecting said sockets to said contacts and means for suitably connecting said outside circuits to a source of electrical energy.

15. A metering panel board having consumption circuit conductors running one way and meter circuit conductors running crosswise thereto for giving a choice of metering connections, one kind of said conductors running less than the entire distance across the other, and being arranged with pairs of them in substantially the same straight line, each of the conductors in a pair crossing a plurality of the conductors transverse to them, and each of the pair leading out to opposite edges of the panel board.

16. In a metering system the combination of a board, parallel conductors thereon provided with contacts leading to one set of external circuits and rows of electrically connected sockets running inwardly alternately from opposite sides of the board, transversely to the first mentioned conductors and electrically connected to another set of external circuits, one set of external circuits including meters and the other set translating devices.

17. In a metering panel board, the combination with the board proper of cross conductors arranged in two superposed sets, the conductors in one set being substantially parallel to each other and the conductors of one set being suitably connected to external consumption circuits and the conductors of the other set being connected to external meter circuits, means for properly connecting the remaining sides of the external circuits to the source of supply and means for electrically connecting the cross conductors at the points of intersection, one set of cross conductors being arranged with pairs of them in substantially the same straight line, each of the conductors in a pair crossing a plurality of the conductors transverse to them.

In witness whereof, I have hereunto subscribed my name in the presence of two witnesses.

ARTHUR C. McWILLIAMS.

Witnesses:
HOWARD M. COX,
C. J. CHRISTOFFEL.